US010131370B1

(12) United States Patent
Harte

(10) Patent No.: US 10,131,370 B1
(45) Date of Patent: Nov. 20, 2018

(54) CART FOR PROTECTED TRANSPORT OF VULNERABLE ARTWORK AND METHOD

(71) Applicant: Glenn W. Harte, Mesquite, NV (US)

(72) Inventor: Glenn W. Harte, Mesquite, NV (US)

( * ) Notice: Subject to any disclaimer, the term of this patent is extended or adjusted under 35 U.S.C. 154(b) by 0 days.

(21) Appl. No.: 15/420,266

(22) Filed: Jan. 31, 2017

(51) Int. Cl.
*B62B 3/00* (2006.01)
*B65D 88/12* (2006.01)
*B65D 81/02* (2006.01)
*B65D 90/02* (2006.01)
*B65D 88/54* (2006.01)
*B62B 3/10* (2006.01)

(52) U.S. Cl.
CPC .............. *B62B 3/002* (2013.01); *B62B 3/001* (2013.01); *B62B 3/10* (2013.01); *B65D 81/02* (2013.01); *B65D 88/12* (2013.01); *B65D 88/54* (2013.01); *B65D 90/02* (2013.01)

(58) Field of Classification Search
CPC ........... B65D 2543/00194; B65D 2543/00231; B65D 2543/00268; B65D 2543/00361; B65D 2543/00527; B65D 2543/00537; B65D 43/0222; B65D 5/528; B65D 81/025; B65D 81/03; B65D 81/053; B65D 81/09; B65D 81/107; B65D 81/133; B65D 88/12; B65D 88/54; B65D 90/02; B65D 2519/00875; B65D 85/30; B65D 81/05; B65D 81/02; B65D 81/1275; B65D 25/10; B65D 81/113; B65D 85/48; B65D 2519/00656; Y02W 90/13; B62B 3/10; B62B 3/002; B62B 3/001; A47B 95/043
See application file for complete search history.

(56) References Cited

U.S. PATENT DOCUMENTS

| | | | | |
|---|---|---|---|---|
| 3,433,500 A | * | 3/1969 | Christensen ............ | B60B 33/00 16/47 |
| 3,655,034 A | * | 4/1972 | Stollman ................ | B65D 81/07 206/454 |
| 4,162,729 A | * | 7/1979 | Kaiser .................. | B65D 5/5028 206/453 |
| 4,583,639 A | * | 4/1986 | Fedick .................. | B65D 85/48 206/325 |
| 4,664,254 A | * | 5/1987 | Sitwell .................. | B65D 81/24 206/1.7 |
| 4,892,193 A | * | 1/1990 | Thomas .................. | B44D 7/00 206/453 |
| 5,259,523 A | * | 11/1993 | Scherb ................. | B65D 11/188 206/449 |
| 5,518,118 A | * | 5/1996 | Putz ...................... | B65D 25/10 206/449 |
| 6,634,156 B1 | * | 10/2003 | Rutledge .............. | B65D 77/042 206/583 |

(Continued)

*Primary Examiner* — John D Walters
*Assistant Examiner* — Hilary L Johns
(74) *Attorney, Agent, or Firm* — Arthur Jacob

(57) ABSTRACT

A cart is conveniently loaded and unloaded for protected transport of vulnerable artwork of larger dimensions. A cage located at the top of the cart includes perimetric members that confine the artwork safely during transport. One of the perimetric members is selectively removable for opening the cage to admit and release the artwork into and out of the cage through a corresponding side of the cage, thereby avoiding lifting of the artwork vertically over the cage during loading and unloading of the artwork transported by the cart.

20 Claims, 3 Drawing Sheets

(56) References Cited

U.S. PATENT DOCUMENTS 7,422,112 B1 * 9/2008 Harte .................. B65D 81/03
                                                                        206/453
7,686,169 B1 * 3/2010 Harte .................. B65D 81/03
                                                                        206/453

* cited by examiner

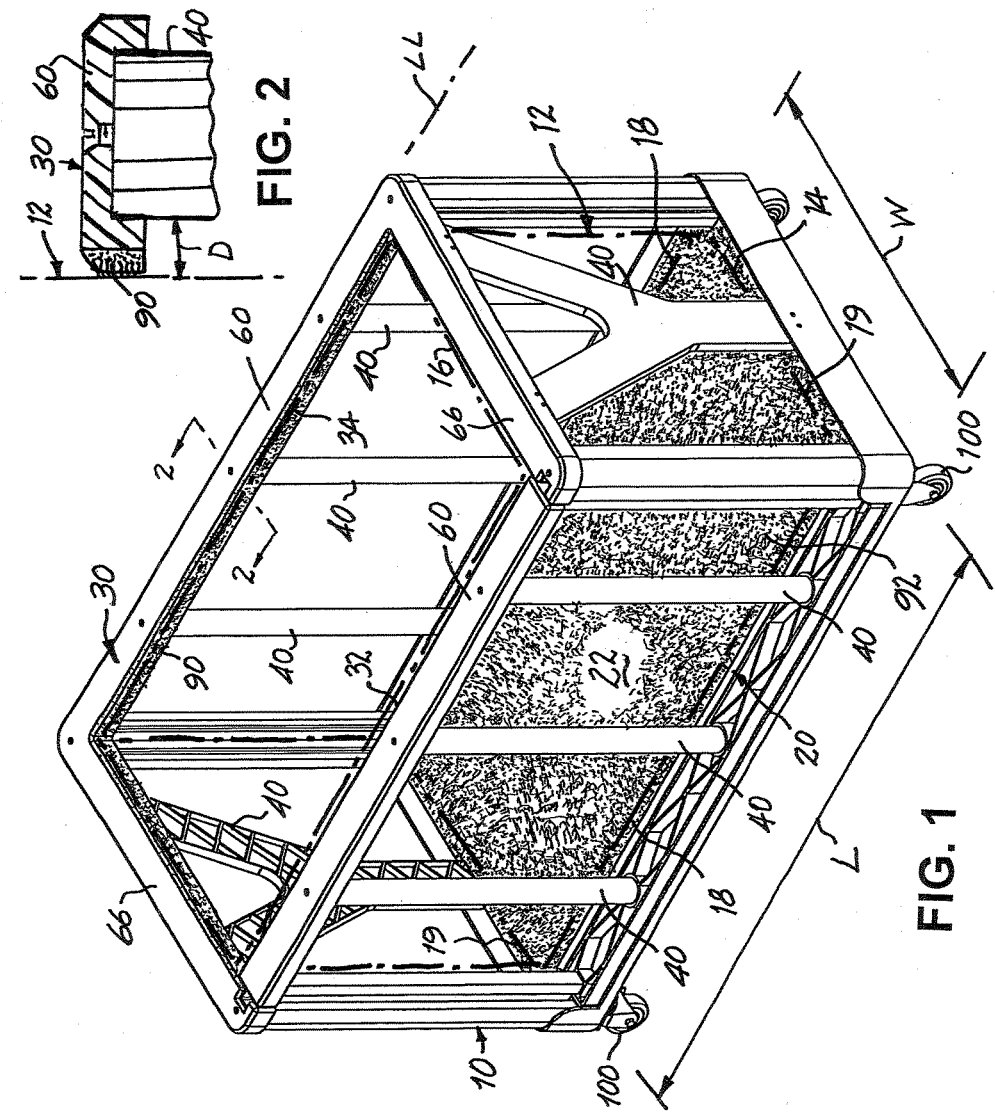

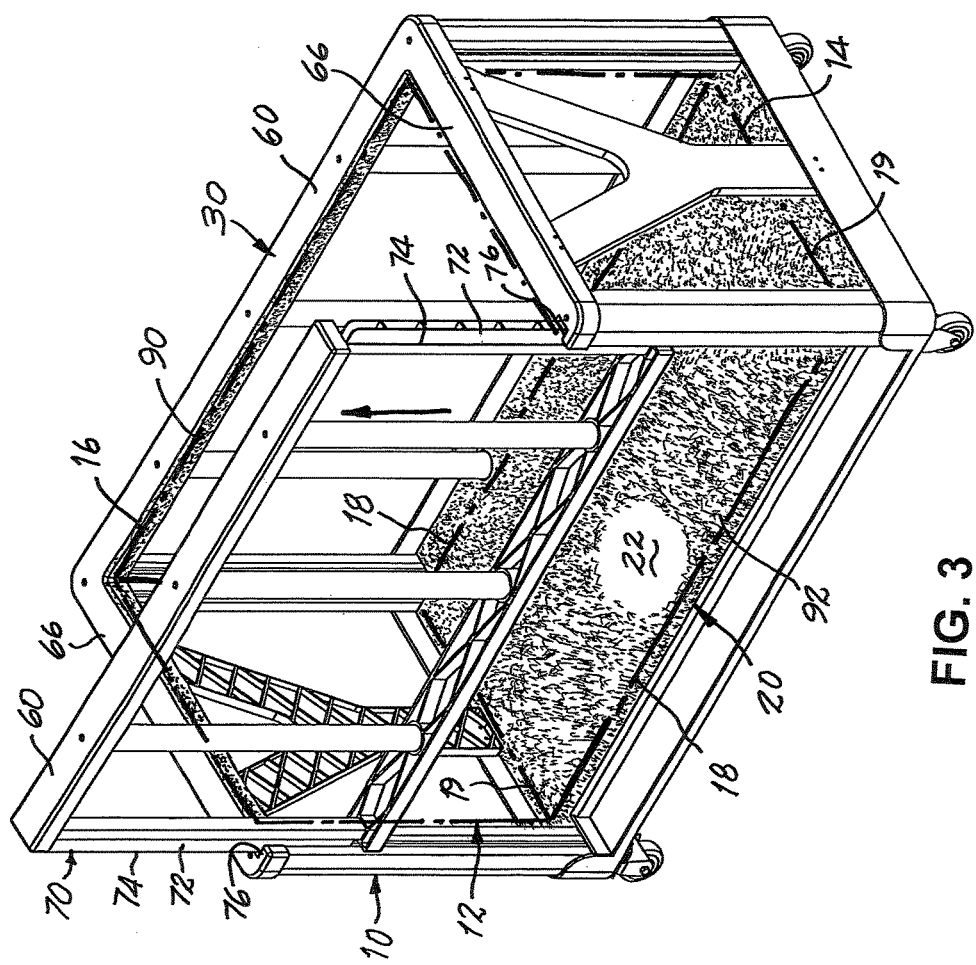

CART FOR PROTECTED TRANSPORT OF VULNERABLE ARTWORK AND METHOD

The present invention relates generally to the transport of vulnerable artwork and pertains, more specifically, to a cart constructed for convenient loading and unloading of such artwork for transport, protected against damage, and a method for such convenient loading and unloading.

The handling of certain vulnerable works of art, such as framed paintings and other framed image, susceptible to damage during transport from one location to another requires protective equipment and procedures in order to prevent such damage. Padded carts commonly are available for carrying out such transport. These carts usually are constructed with a padded interior, including a padded floor and padded sides surrounding the interior, requiring lifting the artwork over the sides and then lowering the artwork into the cart in order to place the artwork within the padded interior. However, in handling larger works of art, such as framed paintings and other images, having a length or width extending to thirty-six to forty eight inches, and beyond, the requirement to lift the artwork over the sides of the cart and then lower the artwork to the floor of the cart can lead to inadvertent damage to the artwork.

The present invention provides a cart construction and a method for loading and unloading the cart with vulnerable artwork, in a manner that militates against inadvertent damage. As such, the present invention attains several objects and advantages, some of which are summarized as follows: Enables the convenient and simplified loading and unloading of a cart for safe transport of artwork vulnerable to inadvertent damage; facilitates the handling of larger works of art vulnerable to potential damage during transport; effectively protects artwork susceptible to damage during handling and transport from such damage; provides highly effective protection to artwork during transport of the artwork from one location to another; accomplishes increased safety, as well as convenience, in the handling and transport of vulnerable works of art; provides a cart of sturdy economical construction capable of effective performance over an extended service life.

The above objects and advantages, as well as further objects and advantages, are attained by the present invention which may be described briefly as a conveniently loaded and unloaded cart for protected transport of vulnerable artwork of larger dimensions, the cart comprising: a plurality of component parts defining a receiving envelope having a bottom, a top, and sides, within which receiving envelope the vulnerable artwork is held protected against damage during transport, the plurality of component parts including a horizontally-oriented floor of prescribed longitudinal length and lateral width, the floor extending along the bottom of the receiving envelope; an essentially horizontally-oriented cage located at a predetermined level vertically above the floor, the cage extending along the top of the receiving envelope and providing a perimetric edge defining an upper perimeter of the receiving envelope; a plurality of vertically-oriented posts extending between the floor and the cage and mounting the cage at the predetermined level, the posts being spaced transversely outwardly from the sides of the receiving envelope such that upon placement of artwork on the floor and within the receiving envelope, the artwork will be retained confined to the receiving envelope by the perimetric edge, spaced away from the posts, and wherein the cage comprises laterally spaced apart, longitudinally extending side perimetric members and longitudinally spaced apart, laterally extending end perimetric members, one of the perimetric members being selectively removable for opening the receiving envelope to admit and release artwork into and out of the receiving envelope through a corresponding side of the receiving envelope, thereby avoiding lifting of the artwork vertically over the cage during loading and unloading of the artwork transported by the cart.

In addition, the present invention provides a method for loading and unloading a cart for protected transport of vulnerable artwork of larger dimensions, the method comprising: providing a plurality of component parts defining a receiving envelope having a bottom, a top, and sides, within which receiving envelope the vulnerable artwork is held protected against damage during transport, the provided plurality of component parts including a horizontally-oriented floor of prescribed longitudinal length and lateral width, the floor extending along the bottom of the receiving envelope; an essentially horizontally-oriented cage located at a predetermined level vertically above the floor, the cage providing a perimetric edge defining an upper perimeter of the receiving envelope; a plurality of vertically-oriented posts extending between the floor and the cage and mounting the cage at the predetermined level, the posts being spaced transversely outwardly from the sides of the receiving envelope such that upon placement of artwork on the floor and within the receiving envelope, the artwork will be retained confined to the receiving envelope by the perimetric edge, spaced away from the posts, and wherein the cage is provided with laterally spaced apart, longitudinally extending side perimetric members and longitudinally spaced apart, laterally extending end perimetric members, the method including selectively removing one of the perimetric members for opening the receiving envelope to admit and release artwork into and out of the receiving envelope through a corresponding side of the receiving envelope, thereby avoiding lifting of the artwork vertically over the cage during loading and unloading of the artwork transported by the cart.

The invention will be understood more fully, while still further objects and advantages will become apparent, in the following detailed description of preferred embodiments of the invention illustrated in the accompanying drawing, in which:

FIG. 1 is a pictorial view of a cart constructed in accordance with the present invention;

FIG. 2 is an enlarged, fragmentary cross-sectional view taken along line 2-2 of FIG. 1;

FIG. 3 is a pictorial view similar to FIG. 1 and showing the cart in a stage of operation in accordance with the method of the present invention.

Figure 4:
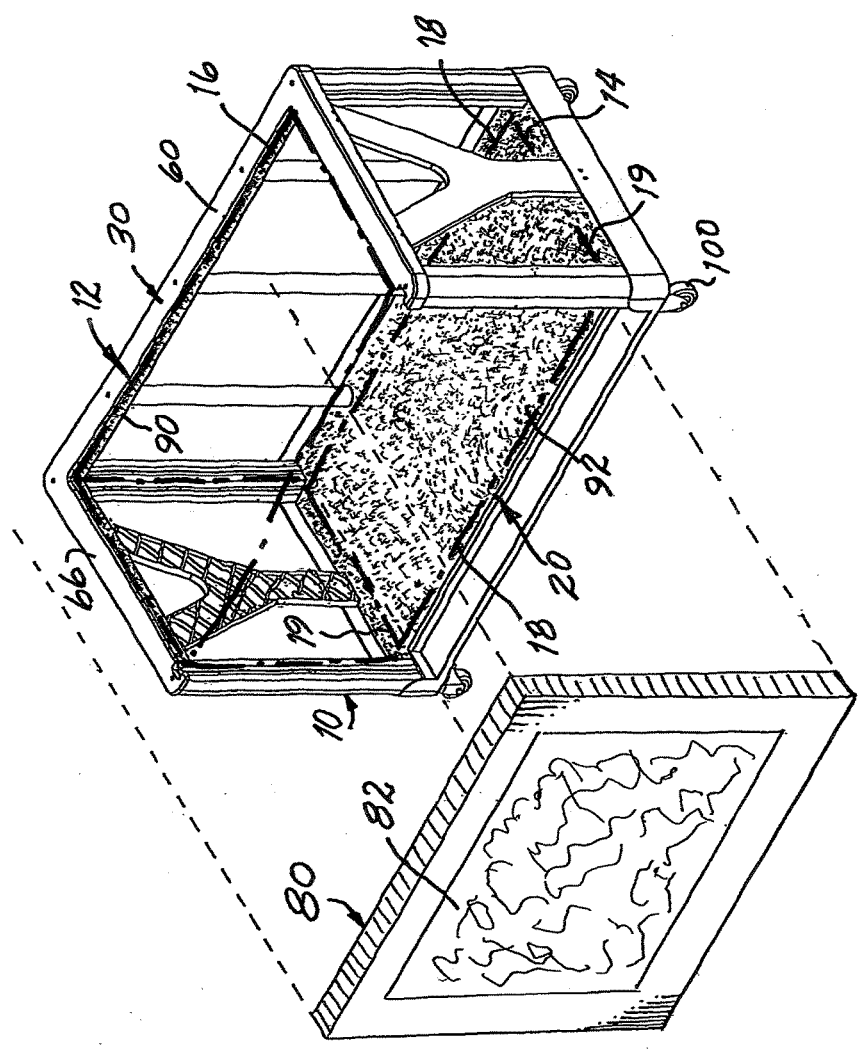
FIG. 4 is a pictorial view similar to FIG. 3, but reduced in size, and showing the cart in a further stage of operation.

Referring now to the drawing, and especially to FIGS. 1 and 2 thereof, a cart constructed in accordance with the present invention is shown at 10 and is seen to comprise a plurality of component parts defining a receiving envelope depicted by phantom lines at 12. Receiving envelope 12 extends vertically between a bottom 14 and a top 16, and includes peripheral sides 18 and ends 19. The plurality of component parts include a horizontally-oriented floor 20 of prescribed longitudinal length L and lateral width W, the floor 20 having a basal area 22 at the bottom 14 of the receiving envelope 12. An essentially horizontally-oriented cage 30 is located at a predetermined level LL vertically above the floor 20, at the top 16 of receiving envelope 12, providing a perimetric edge 32 defining an upper perimeter 34 of the receiving envelope 12, the upper perimeter 34 being spaced vertically above the basal area 22. A plurality of vertically-oriented posts 40 extend between the floor 20 and the cage 30 and serve to mount the cage 30 at the predetermined level LL, at the top 16 of receiving envelope 12. As best seen in FIG. 2, the posts 40 are spaced transversely outwardly from the receiving envelope 12 by a transverse distance D, for reasons more fully discussed below. The cage 30 is comprised of laterally spaced apart, longitudinally extending side perimetric members 60 juxtaposed with and extending along corresponding sides 18 of receiving envelope 12, and longitudinally spaced apart, laterally extending end perimetric members 66 juxtaposed with and extending along corresponding ends 19 of receiving envelope 12.

With reference now to FIGS. 3 and 4, one of the perimetric members 60 and 66, here shown as side perimetric member 60, is at the top of a gate 70 selectively removable from cart 10 for opening the receiving envelope 12. To that end, gate 70 includes a sliding member 72 at each end 74 of the gate 70, each sliding member 72 being engaged for sliding movement within a complementary channel 76. As best seen in FIG. 4, once gate 70 is fully removed, receiving envelope 12 is open at side 18 thereof, enabling convenient loading of artwork 80, here shown in the form of a framed image 82 of relatively large dimensions. With gate 70 removed, loading of artwork 80 is convenient and simplified by merely inserting artwork 80 into receiving envelope 12, through open side 18, without the necessity for lifting artwork 80 vertically over cage 30. Once artwork 80 is located securely in place, gate 70 is returned to the closed position illustrated in FIG. 1, with artwork 80 fully ensconced within receiving envelope 12, surrounded and confined by cage 30.

In order to maximize safe protection of artwork 80 placed within cart 10, a protective bumper 90 of pliable material, such as felt or carpet-like materia and the like, is extended along the cage 30 in confronting relationship to the receiving envelope 12 to protect against scratching, marring or otherwise damaging artwork 80. The spaced relationship between receiving envelope 12 and posts 40, as illustrated by transverse distance D in FIG. 2, assures that artwork 80 will not come into deleterious contact with posts 40. In addition, a protective pliable liner 92 is extended along at least the basal area 22 of the floor 20 to confront the bottom 14 of receiving envelope 12 for further protecting artwork 80 placed within receiving envelope 12.

Once artwork 80 is securely ensconced within cart 10, translation of cart 10 is facilitated by casters 100 depending from the floor 20 of the cart 10. In the preferred construction, casters 100 are constructed of a resiliently conformable material, such as a compliant elastomer, for enabling smooth translation of the cart 10 during transport of artwork 80 placed within receiving envelope 12 of cart 10. Preferably, component parts of cart 10, such as the perimetric members 60 and 66 of cage 30, floor 20 and posts 40, are constructed of lighter weight materials, such as molded synthetic polymeric materials, in order to facilitate translation of cart 10 during transport of artwork 80. Upon arrival of a loaded cart 10 at a selected destination, gate 70 merely is lifted and removed once again to open access to artwork 80, and removal of artwork 80 is accomplished merely by moving the artwork 80 sideways, through open side 18, without requiring lifting of the artwork 80 over cage 30.

It will be seen that the above-described embodiments of the invention attain all of the objects and advantages summarized above, namely: Enables the convenient and simplified loading and unloading of a cart for safe transport of artwork vulnerable to inadvertent damage; facilitates the handling of larger works of art vulnerable to potential damage during transport; effectively protects artwork susceptible to damage during handling and transport from such damage; provides highly effective protection to artwork during transport of the artwork from one location to another; accomplishes increased safety, as well as convenience, in the handling and transport of vulnerable works of art; provides a cart of sturdy economical construction capable of effective performance over an extended service life.

It is to be understood that the above detailed description of preferred embodiments of the invention is provided by way of example only. Various details of design, construction and procedure may be modified without departing from the true spirit and scope of the invention as set forth in the appended claims.

The embodiments of the invention in which an exclusive property or privilege is claimed are defined as follows:

1. A conveniently loaded and unloaded cart for protected transport of vulnerable artwork of larger dimensions, the cart comprising:
    a plurality of component parts defining a receiving envelope having a bottom, a top, and sides, within which receiving envelope the vulnerable artwork is to be held protected against damage during transport, the plurality of component parts including
    a horizontally-oriented floor of prescribed longitudinal length and lateral width, the floor extending along the bottom of the receiving envelope;
    an essentially horizontally-oriented cage located at a predetermined level vertically above the floor, the cage extending along the top of the receiving envelope and providing a perimetric edge defining an upper perimeter of the receiving envelope;
    a plurality of vertically-oriented posts extending between the floor and the cage and mounting the cage at the predetermined level, the posts being spaced transversely outwardly from the sides of the receiving envelope such that upon placement of artwork on the floor and within the receiving envelope, the artwork will be retained confined to the receiving envelope by the perimetric edge, spaced away from the posts, and wherein
    the cage comprises laterally spaced apart, longitudinally extending side perimetric members and longitudinally spaced apart, laterally extending end perimetric members, one of the perimetric members being selectively removable from the top of the receiving envelope while the others of the perimetric members remain mounted on corresponding posts, in place along the top of the receiving envelope, at the predetermined level, for opening the receiving envelope to admit and release artwork into and out of the receiving envelope through a corresponding side of the receiving envelope, thereby avoiding lifting of the artwork vertically over the cage during loading and unloading of the artwork transported by the cart.

2. The cage of claim 1 wherein the one of the perimetric members is a side perimetric member.

3. The cart of claim 1 wherein the one of the perimetric members is mounted for sliding vertically upwardly relative to others of the perimetric members upon removal to open the receiving envelope.

4. The cart of claim 3 wherein the one of the perimetric members is a side perimetric member.

5. The cart of claim 1 including a protective pliable bumper extending along the cage and confronting the receiving envelope for protecting artwork placed within the receiving envelope.

6. The cart of claim 5 including a protective pliable liner extending along the floor and confronting the bottom of the receiving envelope for protecting artwork placed within the receiving envelope.

7. The cart of claim 1 including a protective pliable bumper extending along the cage and confronting the receiving envelope for protecting artwork placed within the receiving envelope, and a protective pliable liner extending along the floor and confronting the bottom of the receiving envelope for protecting artwork placed within the receiving envelope.

8. The cart of claim 7 wherein the one of the perimetric members is mounted for sliding movement vertically upwardly relative to others of the perimetric members upon removal to open the receiving envelope.

9. The cart of claim 8 wherein the one of the perimetric members is a side perimetric member.

10. The cart of claim 1 including resiliently compliant caster wheels depending from the floor for enabling smooth translation of the cart during transport of artwork placed within the receiving envelope.

11. A method for loading and unloading a cart for protected transport of vulnerable artwork of larger dimensions, the method comprising:
providing a plurality of component parts defining a receiving envelope having a bottom, a top, and sides, within which receiving envelope the vulnerable artwork is held protected against damage during transport, the provided plurality of component parts including
a horizontally-oriented floor of prescribed longitudinal length and lateral width, the floor extending along the bottom of the receiving envelope;
an essentially horizontally-oriented cage located at a predetermined level vertically above the floor, the cage providing a perimetric edge defining an upper perimeter of the receiving envelope;
a plurality of vertically-oriented posts extending between the floor and the cage and mounting the cage at the predetermined level, the posts being spaced transversely outwardly from the sides of the receiving envelope such that upon placement of artwork on the floor and within the receiving envelope, the artwork will be retained confined to the receiving envelope by the perimetric edge, spaced away from the posts, and wherein the cage is provided with laterally spaced apart, longitudinally extending side perimetric members and longitudinally spaced apart, laterally extending end perimetric members, the method including selectively removing one of the perimetric members for opening the receiving envelope to admit and release artwork into and out of the receiving envelope through a corresponding side of the receiving envelope, thereby avoiding lifting of the artwork vertically over the cage during loading and unloading of the artwork transported by the cart.

12. The method of claim 11 wherein the selectively removed one of the perimetric members is a side perimetric member.

13. The method of claim 11 including mounting the selectively removed one of the perimetric members for sliding vertically upwardly relative to others of the perimetric members upon removal to open the receiving envelope.

14. The method of claim 13 wherein the selectively removed one of the perimetric members is a side perimetric member.

15. The method of claim 11 including extending a protective pliable bumper along the cage and confronting the receiving envelope for protecting artwork placed within the receiving envelope.

16. The method of claim 15 including extending a protective pliable liner along the floor and confronting the bottom of the receiving envelope for protecting artwork placed within the receiving envelope.

17. The method of claim 11 including extending a protective pliable bumper along the cage and confronting the receiving envelope for protecting artwork placed within the receiving envelope, and extending a protective pliable liner along the floor and confronting the bottom of the receiving envelope for protecting artwork placed within the receiving envelope.

18. The method of claim 17 including mounting the one of the perimetric members for sliding movement vertically upwardly relative to others of the perimetric members upon removal to open the receiving envelope.

19. The method of claim 18 wherein the selectively removed one of the perimetric members is a side perimetric member.

20. The method of claim 11 including providing resiliently compliant caster wheels depending from the floor for enabling smooth translation of the cart during transport of artwork placed within the receiving envelope.

* * * * *